Aug. 13, 1929.  J. L. PERKINS  1,724,511
BROACH
Filed March 31, 1927
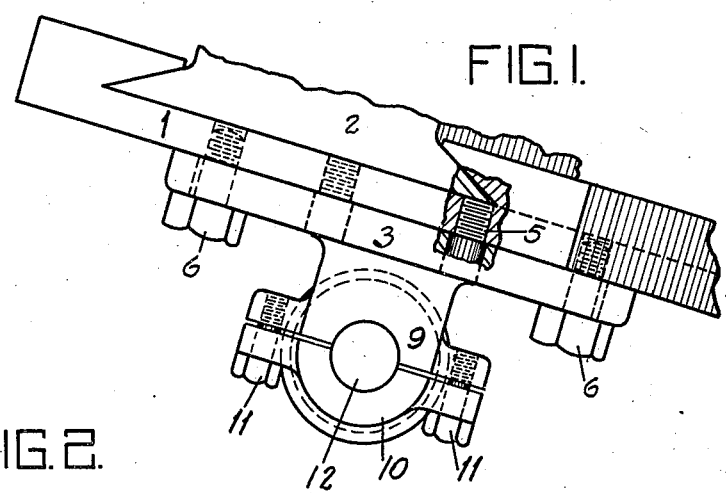
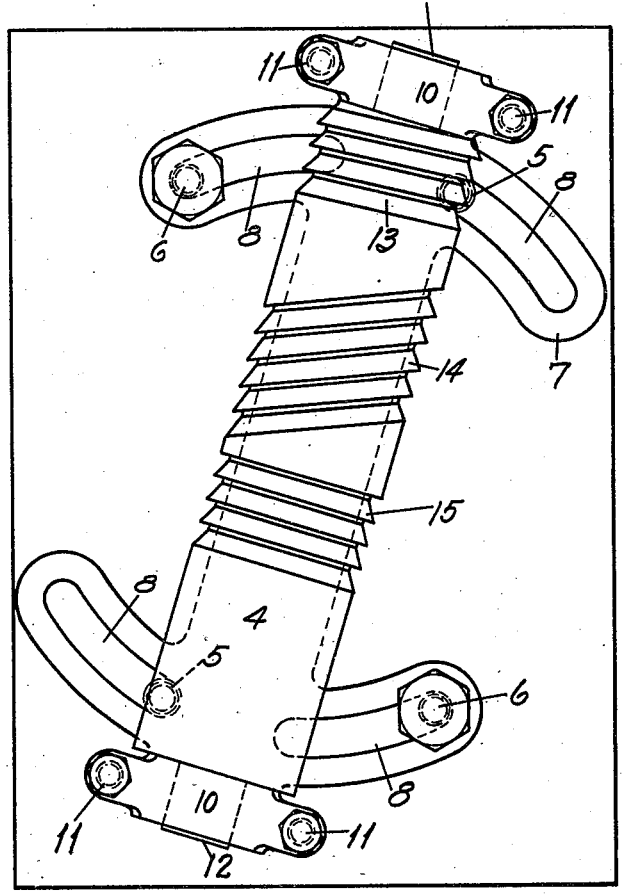
INVENTOR.
Julian L. Perkins,
BY
Frank A. Cutter,
ATTORNEY.

Patented Aug. 13, 1929.

1,724,511

UNITED STATES PATENT OFFICE.

JULIAN L. PERKINS, OF WEST SPRINGFIELD, MASSACHUSETTS, ASSIGNOR TO PERKINS MACHINE AND GEAR COMPANY, OF SPRINGFIELD, MASSACHUSETTS, A CORPORATION OF MASSACHUSETTS.

BROACH.

Application filed March 31, 1927. Serial No. 179,953.

My invention relates to cutting or broaching implements carried by reciprocating members and thereby caused to act on the work, and resides in a cutter which consists of a cylindrical member or body provided with spiral or circular teeth, a reciprocating carrier, and a holder, for said cutter, mounted on said carrier for adjustment at different angles to the plane or direction of movement of the carrier, together with such other parts and members as may be necessary or desirable in order to render the broach complete and serviceable in every respect, all as hereinafter set forth.

One object of my invention is to produce a broach designed more especially for acting on either plain or curved surfaces each of some considerable area, and which is capable of being arranged to cut over a more extensive area than could be cut, at any one stroke, if said broach were arranged to cut in the direction of its axis, instead of in a direction that is in angular relation to said axis. In short, with this broach I am able to make a much wider cut at each stroke of the broach than would otherwise be possible.

Another object is to provide a broach of this character with means for adjustment, whereby said broach can be set to cut areas of different widths, or, in other words, can be set to the width of the work to be broached.

This broach is comparatively simple both in construction and operation, and few parts are required in the construction of the same, and those parts of a character that preclude liability of breaking or getting out of order.

Other objects and advantages will appear in the course of the following description.

I attain the objects and secure the advantages of my invention by the means illustrated in the accompanying drawings, in which—

Figure 1 is a top plan of a broach which embodies a practical form of my invention, with parts broken out and broken away, and, Fig. 2, a front elevation of said broach.

Similar reference characters designate similar parts throughout the several views.

The first view is projected from the second in such a manner that the axis of the body of the cutter on the plan is in the same plane in which is located said axis in the elevation.

The broach as a whole comprises a carrier 1, which is constructed in the present example to slide up and down on a column represented at 2 in Fig. 1, a holder 3, and a broach proper or cutter 4.

The carrier 1 is a plate undercut on the back side to form a dove-tail connection with the column 2, whereby said carrier is held to said column and at the same time capable of being reciprocated thereon. In the carrier 1 are two or more tapped openings 5, there being four such openings in the present case. Two of these openings are located above and two below the horizontal center of the carrier, and two bolts 6 are provided and either is receivable in any of said openings, but in practice the two bolts are placed in upper and lower openings which are on opposite sides of the central, transverse, vertical plane of said carrier, or of a plane between the two upper and the two lower openings.

The holder 3 comprises a bar having at each end an arcuate head 7 in which are two slots 8, and provided at the ends beyond said heads with forwardly projecting bearings 9—9 to which caps 10—10 are secured by means of bolts 11. The heads 7 with the slots 8 therein are struck from a common center from which they are equidistant, and each of said heads projects the same distance on each side of a bisecting line passing through said center. The openings 5 in the carrier 1 are arranged in arcs corresponding with the arcuate centers of the heads 7, and have corresponding diameters, consequently the slots 8 in said heads can be located over the front ends of said openings, and the bolts 6 passed through said slots into two of said openings, the slots being of the proper width to receive the shanks of the bolts. In the present example, one of the bolts 6 is passed through the left-hand slot 8 in the upper head 7, and the other of said bolts is passed through the right-hand slot 8 in the lower head 7. The holder 3 thus placed on the carrier 1 has its longitudinal center inclined from above downwardly and to the left. Since the bolts 6 are respectively located here in the outer ends of the left-hand upper and the right-hand lower slots 8, the holder 4 is positioned at its maximum inclination from above downwardly to the left. Upon loosening the bolts 6 and moving the holder 3 about its center, the amount of inclination of said holder is decreased, and will disappear altogether if the holder be caused to assume a vertical position. After the holder has been adjusted the bolts 6 are again tightened.

If it be desired to arrange the holder 3 with its major inclination from above downwardly and to the right, the bolts 6 are removed from the positions which they occupy in the drawings, and inserted in the other two slots 8 and the other two openings 5.

The broach proper or cutter 4 comprises a cylindrical body having at the ends trunnions 12—12 which are mounted in the bearings 9 behind the caps 10. There is sufficient clearance between the caps 10 and the bearings 9 to enable said caps to be drawn by the bolts 11 tightly against the trunnions 12 and thus rigidly secure said trunnions in place and hold the cutter against rotation. The cutter is also provided with or consists in part of teeth which may be of the single-lead type, the multiple-lead type, or the ring type, the latter being without any lead. Any one or more of these three types of teeth may be employed in the construction of the cutter, and they may extend the entire length of the body of the cutter, or only a portion of such length. In the present example, I have shown the three types of teeth on the body of the cutter, and these encircling only certain portions of said body, leaving other portions of the same without teeth. At the upper end of the cutter 4 are single-lead teeth 13, below these are double-lead teeth 14, and finally is a set of ring teeth 15.

If the cutter 4 were disposed vertically, the vertically reciprocating carrier 1 would cause the teeth 13, 14, and 15, to cut over a comparatively narrow surface with their front portions, and this might be done, but, by arranging said cutter obliquely to the direction of travel, the surface cut by said teeth is increased in width accordingly, as is plainly to be seen, and the special purpose of the broach is attained. The width of the surface cut is increased or decreased by adjusting the holder 3 at a greater or less angle to the direction of movement.

The broach cuts on the down stroke only.

More or less change in the shape, size, construction, and arrangement of some or all of the parts of this broach may be made, without departing from the spirit of my invention or exceeding the scope of what is claimed.

What I claim as my invention, and desire to secure by Letters Patent, is—

1. The combination, with a reciprocating carrier, of a holder mounted on said carrier, a cylindrical non-rotating cutter having cylindrical peripheral teeth, means rigidly to attach said cutter at both ends to said holder, but to permit the cutter to be adjusted about its longitudinal axis, and means to adjust said holder with said cutter about the cutter axis perpendicular to the plane of said carrier.

2. The combination, in a broach, with a reciprocating carrier, of a holder provided with bearings and arcuate heads, a cylindrical cutter having peripheral teeth, and at opposite ends provided with trunnions mounted in said bearings, and means to attach said holder to said carrier in different positions relative to the direction of movement of the carrier, said means being adapted to engage said heads at different points, and to enable said holder and with it said cutter to be partially rotated about the center common to the arcs of said heads, such partial rotation being about the axis perpendicular to the plane of the carrier.

3. The combination, in a broach, with a reciprocating carrier provided with bolts arranged on opposite sides of an approximately vertical plane, of a holder having heads with arcuate slots therein to receive said bolts, and provided with bearings, the axial centers of said bearings being in a line which is or may be in angular relationship to the direction of movement of the carrier, and a cutter having trunnions mounted in said bearings.

4. In a broach, a holder, a cylindrical cutter, having peripheral teeth, secured at the ends to said holder, a reciprocating carrier, and means to mount said holder for adjustment about the axis perpendicular to the plane of the carrier, on said carrier, whereby the cutter may be located at different angles to the direction of travel of the carrier.

5. The combination, in a broach, with a reciprocating carrier, of a holder having arcuate heads, and provided with bearings, means to attach said heads to said carrier in different positions relative to the direction of movement of the carrier, said means being adapted to engage said heads at different points, and to enable said holder to be partially rotated about the center common to the arcs of said heads, and a cutter having trunnions mounted in said bearings, the construction and arrangement of parts being such that said cutter can be positioned by and with said holder at different angles to said direction of movement.

JULIAN L. PERKINS.